(12) United States Patent
Thorne et al.

(10) Patent No.: US 6,777,908 B2
(45) Date of Patent: Aug. 17, 2004

(54) METHOD AND APPARATUS FOR CORRECTING AND MAINTAINING VOLTAGE BALANCE IN MULTIPLE CELL BATTERY CONFIGURATIONS

(75) Inventors: Richard E. Thorne, Carlsbad, CA (US); William Von Novak, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 3 days.

(21) Appl. No.: 10/144,914

(22) Filed: May 13, 2002

(65) Prior Publication Data

US 2003/0210016 A1 Nov. 13, 2003

(51) Int. Cl.[7] .................................................. H02J 7/00
(52) U.S. Cl. ........................ 320/103; 320/119; 323/365
(58) Field of Search ................................ 320/103, 116, 320/118, 119, 163, 166, 164, 122; 323/365, 366, 367, 369; 324/95, 106

(56) References Cited

U.S. PATENT DOCUMENTS 5,648,713 A * 7/1997 Mangez ...................... 320/103

* cited by examiner

Primary Examiner—Rajnikant B. Patel
(74) Attorney, Agent, or Firm—William M. Hooks

(57) ABSTRACT

A battery cell balancing method and apparatus. A simple and inexpensive method and apparatus to balance the cells within a battery configuration where at least some of the cells are arranged in series or a combination of series and parallel. One embodiment balances the cells proportionally to the level of imbalance between the cells. This embodiment is adaptable to more than two cells in series. Another embodiment balances the cells with a constant current. This embodiment will more quickly balance the cells because of the constant current. Components are selected in specific positions to reduce the current draw of the circuit and the effect on the system. The invention injects current into or withdraws current from a position between series cells to be balanced based on whether the voltage is higher or lower than the fractional voltage needed for the cells to be in balance.

10 Claims, 3 Drawing Sheets

METHOD AND APPARATUS FOR CORRECTING AND MAINTAINING VOLTAGE BALANCE IN MULTIPLE CELL BATTERY CONFIGURATIONS

BACKGROUND OF THE INVENTION

I. Field of the Invention

The present invention relates to the field of batteries, and more specifically, to battery configurations with multiple series or combination series and parallel cell arrangements.

II. Related Art

Batteries and battery "packs" using a variety of battery or cell configurations act as the necessary power source for many modern products. They are a critical component of portable electronic devices, such as cellular telephones, laptop computers, compact disc (CD) players, and similar types of battery-operated devices. The longer a particular battery or configuration of batteries can provide power to a cell phone or laptop the longer a user is able to enjoy use of those items. Moreover, the shorter the time it takes to charge a battery configuration, the sooner the user is able to use those items away from a power outlet.

The term "battery pack" herein refers to a variety of battery configurations which employ multiple cells configured in series, or cells arranged in a combination of series and parallel configurations.

Ideally, the cells in the battery pack that are arranged in series would have exactly the same voltage and, therefore, be in balance.

Because each cell in a given battery pack has slightly different charge and discharge characteristics in real applications, the cells will eventually become unbalanced as they are discharged and recharged. Typically, as the number of charge and discharge cycles increases, the level of imbalance increases.

Typical charging circuitry is unable to fully charge the configuration because of the imbalance. This reduces the usable capacity of the battery pack, eventually, causing the battery pack to become useless.

There are other techniques in use for voltage balancing. However, many are either complex or expensive or both. What is, therefore, desired is a simple and inexpensive battery pack with a method and apparatus to maintain the balance between the cells.

SUMMARY OF THE INVENTION

The present invention provides a simple and inexpensive method and apparatus which can be incorporated in a battery pack or directly in an electric or electronic device, that maintains charge balance between the cells within, thereby increasing the usable life of the battery pack and the usage time of the powered product. Individual cell voltages within a pack and the total voltage of the battery pack are monitored by an op-amp having at least a positive input terminal, a negative input terminal and an output terminal. Terminal is well known in the art to mean a variety of physical forms by which electrical connections are made. The final form of the terminal will be determined by those skilled in the art as to the actual connection method used. An example of terminals might be, a screw terminal, a wire wrap, or a solder pad. A comparison to the desired voltage is made by the op-amp and corrective current is then injected or removed by the op-amp from appropriate positions within the battery pack to balance or maintain the individual cell voltages.

The invention utilizes a low power op-amp to compare the voltage at the junction between the series battery cells to the total voltage. The connection point between the cells being balanced is referred to as the inter-cell interface. If the cells are balanced this voltage will be a fraction of the total voltage. As an example, with two cells the voltage would be one half the total voltage. With three cells the total would be one third the total voltage. If the voltage at the junction does not equal the appropriate fraction of the total voltage, current is injected or withdrawn until balance is achieved.

The invention can continue to perform the monitoring and maintaining of the cell balance during storage, as well as during charging and discharging of the cells.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Figure 1:
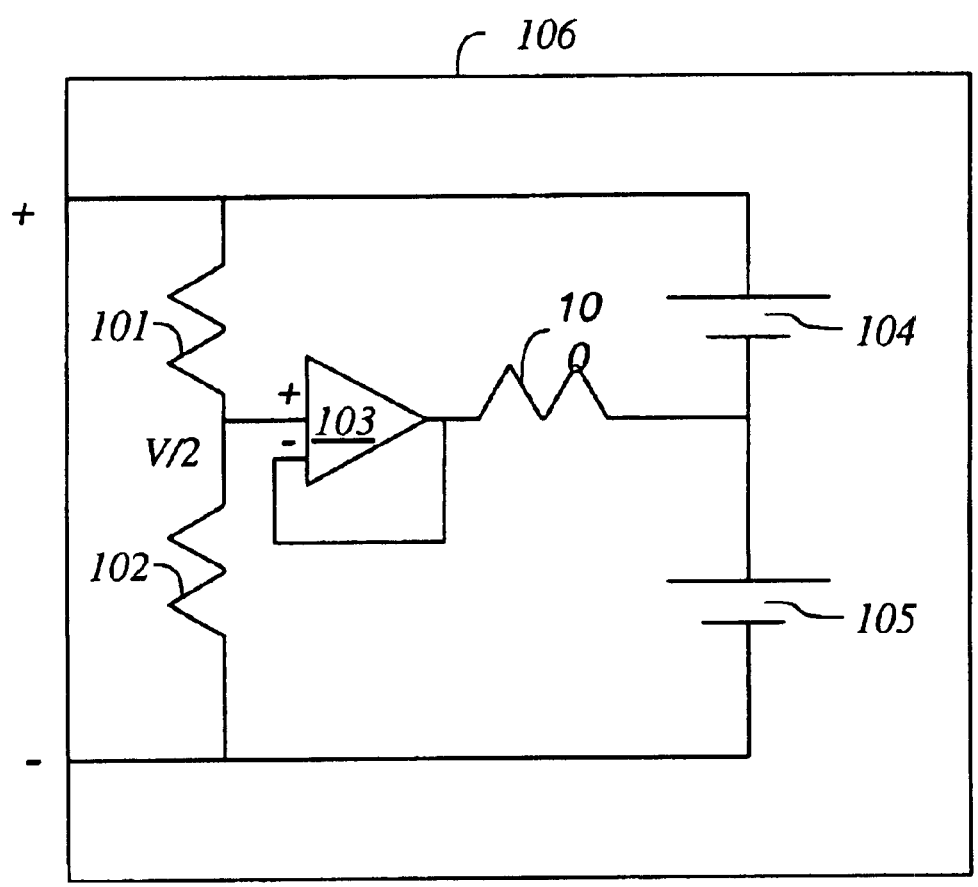
FIG. 1 illustrates an embodiment of the invention for use with a battery pack having two cells.

The present invention provides a battery pack with a simple and inexpensive method and apparatus for monitoring and maintaining charge balance between series or combination series and parallel cells. An example of one preferred embodiment is illustrated in FIG. 1. This embodiment can be expanded to maintain cell balance for more than two cells. In this embodiment the op-amp acts as a voltage follower, the voltage at the op-amp positive input and the voltage at the op-amp output are considered the same value. For this embodiment the current injected or withdrawn will be proportional to the level of imbalance in the cells.

The voltage at the connection point between resistors 101 and 102 will be half of the sum of the voltages of the series cells 104 and 105. This point is referred to as V/2 and is monitored by op-amp 103. Cells 104 and 105 can be out of balance with cell 104 at a higher voltage level than cell 105 or cell 105 at a higher voltage level than cell 104.

When cell 105 has a higher voltage than cell 104, the voltage at V/2, which will be the same voltage at the output of op-amp 103, is lower than the voltage level of cell 105. In this situation, op-amp 103 causes current to flow from the inter-cell interface toward the op-amp. The current flows through cell 105 in a discharging direction (from cell 105 negative to positive) and through cell 104 in a charging direction (from cell 104 positive to negative), thereby the invention is functioning to bring the cells into balance.

When cell 104 has a higher voltage than cell 105 the voltage at V/2, which will be the same voltage at the output of op-amp 103, is higher than the voltage level of cell 105. In this situation, op-amp 103 causes current to flow into the inter-cell interface from the op-amp. The current flows through cell 104 in a discharging direction and through cell 105 in a charging direction, thereby the invention is functioning to bring the cells into balance.

In FIG. 1, low power op-amp 103 is connected as illustrated between resistors 100, 101, 102. Using a low power op-amp reduces the power drain caused by the op-amp circuit as well as reduces the effect it has at the voltage divide V/2 between resistors 101 and 102. The voltage at the V/2 point is monitored by op-amp 103 and since op-amp 103 in this embodiment is functioning as a voltage follower, op-amp 103 delivers the same voltage level as the level of V/2 to the op-amp 103 output. A first end of resistor 100 is connected to the output of op-amp 103. The second end of resistor 100 is connected to an inter-cell interface between cells 104 and 105. Depending on the voltage imbalance between the cells, current flows into the inter-cell interface or out of the inter-cell interface. A first end of resistor 101 is connected to the positive input of op-amp 103. The second end of resistor 101 is connected to an external cell positive interface.

The external-cell positive interface is defined as the positive connection point outside of the grouping of cells for which balancing is being performed. The voltage level at this point should be representative of the total voltage for the cell grouping for which balancing is being performed. A first end of resistor 102 is connected to the positive input for op-amp 103. The second end of resistor 102 is connected to an external cell negative interface. The external cell negative interface is defined as the negative connection point outside of the grouping of cells for which balancing is being performed. The voltage level at this point should be representative of zero volts for the series cell grouping for which balancing is being performed.

A connection is made between the negative input of op-amp 103 and the first end of resistor 100.

Resistors 101 and 102 are high impedance and precision matched. The high impedance reduces the power drain of the balancing circuit. The matching of the 101 and 102 resistors effects the level of cell balancing achievable. Therefore, it is very desirable to have close matching of resistance values to a high level of accuracy to achieve a high level of balancing.

An example of what could be considered high impedance and precision matched, for a battery pack, for use in a cellular phone, would be on the order of 1% resistors having an impedance rating of around 1 mega ohm each. This example is not in any way intended to limit the applicability of the invention. The level of balancing desired, the amperage and voltages involved for a particular application, and the physical relationship of the components will dictate the actual values for each component for different applications as will be readily apparent to those skilled in the art. While this example of use of the invention is for a handheld electronic device, the invention can readily be applied to much larger devices or smaller devices.

Figure 2:
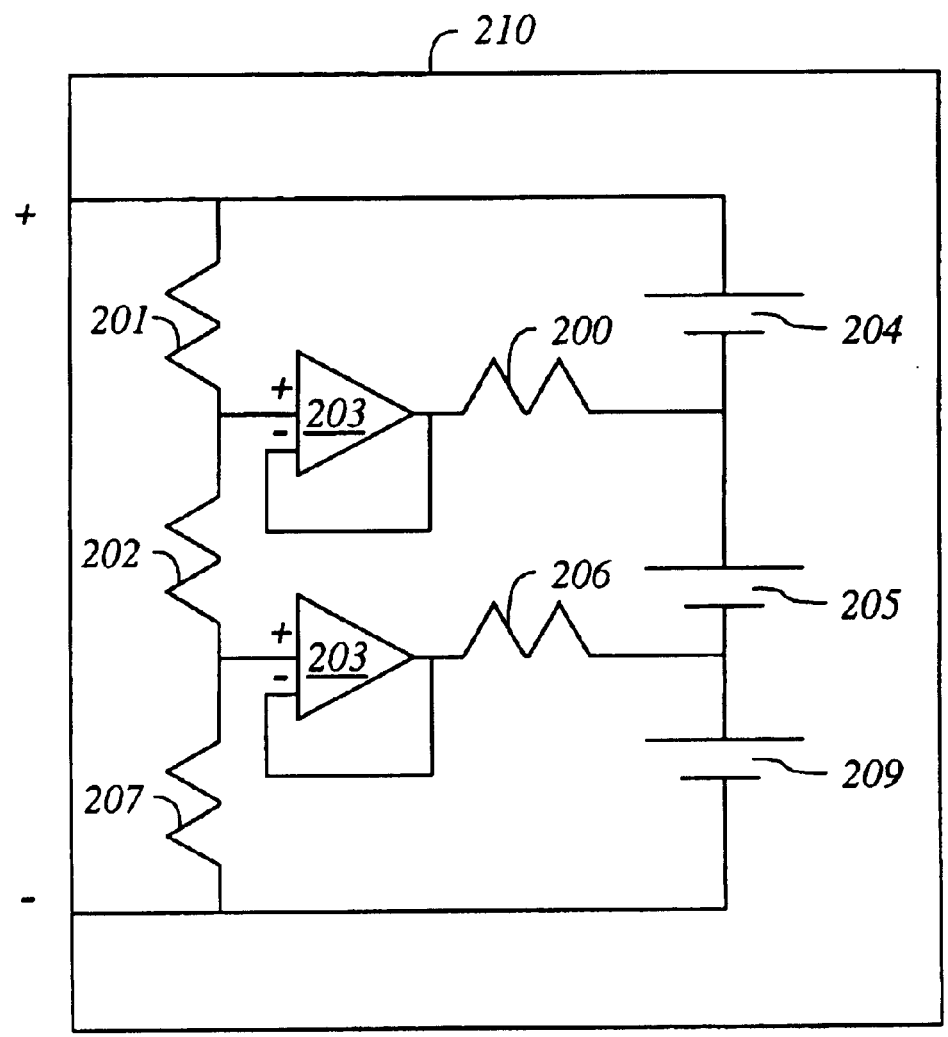
FIG. 2 illustrates an embodiment of the invention for use with a battery pack with three cells or more.

It is possible to extend the use of the invention in FIG. 1 to more than two series cells for balancing. An example of how to configure the invention for more than two cells is illustrated in FIG. 2. The changes described in relation to FIG. 2 to increase the number of cells to be balanced from two to three, can be expanded to further increase the number of cells balanced beyond three.

FIG. 2 illustrates a battery pack 210 and is an expansion of the embodiment of FIG. 1. In FIG. 2, low power op-amp 203 is connected as illustrated between resistors 200, 201, 202. A first end of resistor 200 is connected to the output of op-amp 203. The second end of resistor 200 is connected to an inter-cell interface between cells 204 and 205. With three cells in series being balanced the voltage between cells 204 and 205 would be two thirds of the total voltage for the cell grouping for which balancing is being performed. A first end of resistor 201 is connected to the positive input of op-amp 203. The second end of resistor 201 is connected to an external cell positive interface. A first end of resistor 202 is connected to the positive input of op-amp 203. The second end of resistor 202 is connected to the positive input of op-amp 208. Op-amp 208 is connected between resistors 202, 206, 207. A first end of resistor 206 is connected to the output of op-amp 208. The second end of resistor 206 is connected to an inter-cell interface between cells 205 and 209. With three cells in series being balanced, the voltage between cells 205 and 209 would be one third of the total voltage of the cell grouping for which balancing is being performed. A first end of resistor 207 is connected to the positive input of op-amp 206. The second end of resistor 207 is connected to an external cell negative interface for the cell grouping for which balancing is being performed.

A connection is made between the negative input of op-amp 203 and the first end of resistor 200. A connection is made between the negative input of op-amp 208 and the first end of resistor 206.

Resistors 201, 202 and 207 are high impedance and precision matched.

Figure 3:
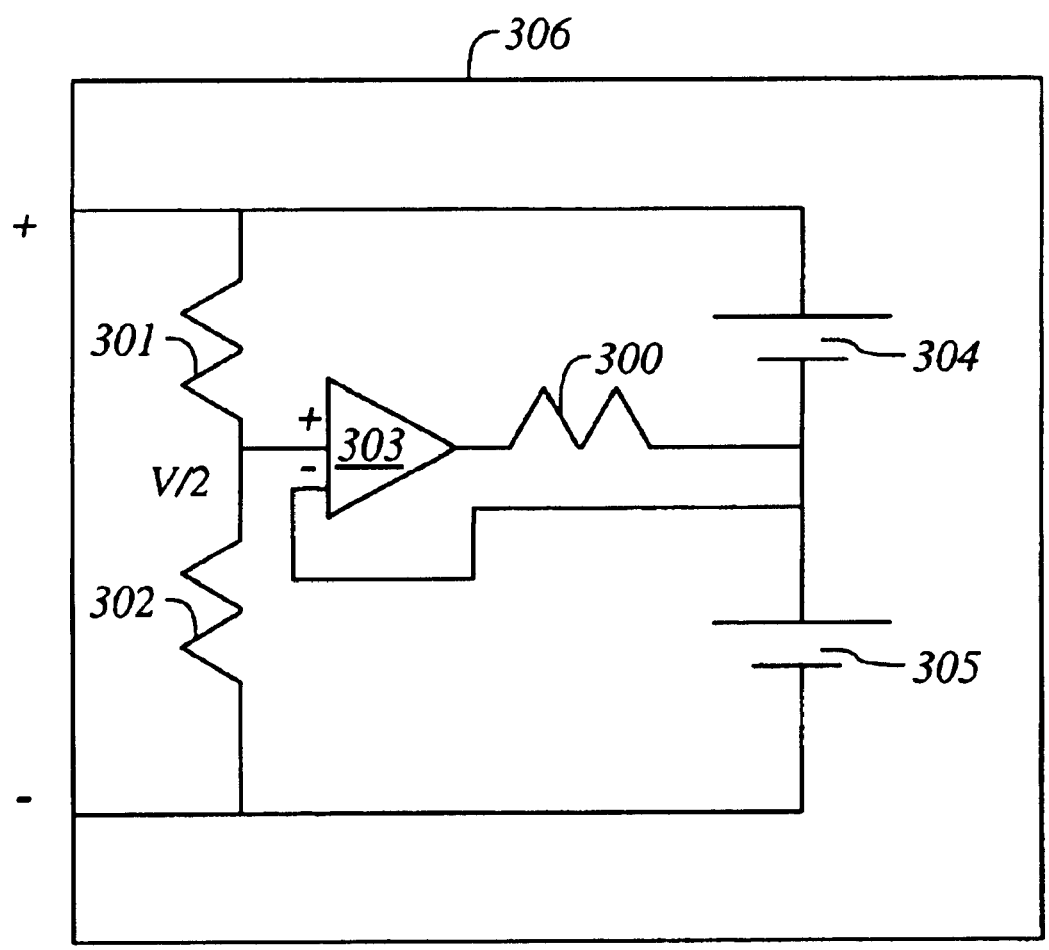
FIG. 3 illustrates another embodiment of the invention for use with a battery pack with two cells.

FIG. 3 illustrates a battery pack 306 according to another embodiment. In this embodiment op-amp 303 acts as a comparator. The current injected or withdrawn will be relatively constant and irrespective of the level of imbalance of cells 304 and 304. When op-amp 303 is functioning as a comparator it is comparing the voltage of V/2 at the positive input to op-amp 303, against the inter-cell interface voltage at the negative input to op-amp 303. Depending on which voltage is higher, op-amp 303 either establishes the total voltage of the cells in series for which balancing is being performed, at the output of op-amp 303, or it establishes zero volts at the output of op-amp 303.

When V/2 is higher than the voltage level at the inter-cell interface between cells 304 and 305, which is the situation when the voltage level of cell 304 is higher than the voltage level of cell 305, op-amp 303 flows current toward the inter-cell interface from the op-amp, thereby functioning to balance the cells.

When V/2 is lower than the voltage level at the inter-cell interface between cells 304 and 305, which is the situation when the voltage level of cell 305 is higher than the voltage level of cell 304, op-amp 303 flows current out of the inter-cell interface toward the op-amp, thereby functioning to balance the cells.

In FIG. 3 low power op-amp 303 is connected as illustrated between resistors 300, 301, 302. A first end of resistor 100 is connected to the output of op-amp 303. The second end of resistor 300 is connected to an inter-cell interface between cells 304 and 305. A first end of resistor 301 is connected to the positive input of op-amp 303. The second end of resistor 301 is connected to an external cell positive interface. A first end of resistor 302 is connected to the positive input for op-amp 303. The second end of resistor 302 is connected to an external cell negative interface.

A connection is made between op-amp negative and the second end of resistor 300.

Resistors 301 and 302 are high impedance and precision matched.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

What is claimed is:

1. A voltage balancing circuit comprising:
   a low power op-amp having a positive input terminal, a negative input terminal, and an output terminal;
   said op-amp connected to a first resistor;
   said first resistor having a first and second end, said first end connected to said op-amp output terminal and said second end connected to an inter-cell interface;
   a second high impedance resistor connected between said op-amp positive input terminal and an external-cell positive interface;
   a third high impedance resistor connected between said op-amp positive input terminal and an external-cell negative interface;
   wherein said second and third resistors are precision matched; and
   a connection between said op-amp negative input terminal and said first end of said first resistor wherein either:
     current flows away from said op-amp and in the direction of said inter-cell interface when appropriate to balance voltages; or
     current flows in the direction of said op-amp and away from said inter-cell interface when appropriate to balance voltages.

2. The voltage balancing circuit of claim 1 wherein said high impedance resistors are on the order of one mega ohm or more.

3. The voltage balancing circuit of claim 1 or claim 2 wherein said high impedance resistors are known to a precision of 1% of their listed rating.

4. A voltage balancing circuit comprising;
   a low power op-amp having a positive input terminal, a negative input terminal, and an output terminal;
   said op-amp connected to a first resistor;
   said first resistor having a first and second end, said first end connected to said op-amp output terminal and said second end connected to an inter-cell interface;
   a second high impedance resistor connected between said op-amp positive input terminal and an external-cell positive interface;
   a third high impedance resistor connected between said op-amp positive input terminal and an external-cell negative interface;
   wherein said second and third resistors are precision matched; and
   a connection between said op-amp negative input terminal and said second end of said first resistor wherein either:
     current flows away from said op-amp and in the direction of said inter-cell interface when appropriate to balance voltages; or
     current flows in the direction of said op-amp and away from said inter-cell interface when appropriate to balance voltages.

5. The voltage balancing circuit of claim 4 wherein said high impedance resistors are on the order of one mega ohm or more.

6. The voltage balancing circuit of claim 4 or claim 5, wherein said high impedance resistors are known to a precision of 1% of their listed rating.

7. A battery pack comprising:
   multiple cells at least two of which are arranged in series; and
   the voltage balancing circuit of any of claims 1, 2, 4, or 5.

8. A battery pack comprising:
   multiple cells at least two of which are arranged in series; and
   the voltage balancing circuit of claim 3.

9. A battery pack comprising:
   multiple cells at least two of which are arranged in series; and
   the voltage balancing circuit of claim 6.

10. A method for balancing multiple series cells comprising the steps of:
    measuring a fractional voltage level of a total voltage of said multiple cells for which balancing is being performed;
    comparing said measured fractional voltage to a inter-cell interface voltage;
    generating a output voltage; and
    applying said output voltage to said inter-cell interface such that current flows either away from or into said inter-cell interface when appropriate to balance voltages.

* * * * *